United States Patent [19]
Ishikawa

[11] Patent Number: 5,687,697
[45] Date of Patent: Nov. 18, 1997

[54] VEHICLE FUEL VAPOR TREATING APPARATUS

[75] Inventor: Takashi Ishikawa, Okazaki, Japan

[73] Assignee: Toyota Jidosha Kabushiki Kaisha, Toyota, Japan

[21] Appl. No.: 605,619

[22] Filed: Feb. 22, 1996

[30] Foreign Application Priority Data

Feb. 24, 1995 [JP] Japan .................. 7-037280

[51] Int. Cl.$^6$ .................................. F02M 33/02
[52] U.S. Cl. .................................. 123/520; 123/557
[58] Field of Search .................... 123/520, 521, 123/519, 518, 516, 557; 220/86 R

[56] References Cited

U.S. PATENT DOCUMENTS

| | | | |
|---|---|---|---|
| 3,752,135 | 8/1973 | Peterson | 123/519 |
| 4,714,172 | 12/1987 | Morris | 220/86 R |
| 4,727,955 | 3/1988 | Honda | 123/519 |
| 4,787,643 | 11/1988 | Shirata | 123/519 |
| 4,793,839 | 12/1988 | Hayashida | 123/519 |
| 4,805,581 | 2/1989 | Yamada | 123/519 |
| 4,815,436 | 3/1989 | Sasaki | 123/520 |
| 5,060,620 | 10/1991 | Osalpas | 123/519 |
| 5,111,900 | 5/1992 | Lettermann | 123/519 |
| 5,427,076 | 6/1995 | Robayashi | 123/520 |

FOREIGN PATENT DOCUMENTS

| | | | |
|---|---|---|---|
| 0588729 | 3/1994 | European Pat. Off. | 123/520 |
| 0063514 | 5/1977 | Japan | 123/519 |
| 0220951 | 12/1983 | Japan | 123/520 |
| 136164 | 8/1986 | Japan . | |
| 279125 | 12/1987 | Japan . | |
| 176650 | 7/1988 | Japan . | |
| 119419 | 8/1988 | Japan . | |

*Primary Examiner*—Carl S. Miller
*Attorney, Agent, or Firm*—Kenyon & Kenyon

[57] ABSTRACT

An apparatus for treating fuel vapor in a vehicle is described. The apparatus collects and treats fuel vaporized in the vehicle's fuel tank. The apparatus has a canister which collects the fuel vapor. The canister accommodates an adsorbent which adsorbs the vaporized fuel and separates the fuel when required. The rear frame of the vehicle includes a left side member, a right side member, a cross member connecting both side members, and a floor pan arranged between each member. The floor pan has a downwardly recessed tire housing. The canister is provided in the space defined between one side member, the cross member, the floor pan, and the tire housing. An exhaust pipe is provided adjacent to the space to effectively heat the canister with exhaust heat.

4 Claims, 4 Drawing Sheets

1

VEHICLE FUEL VAPOR TREATING APPARATUS

BACKGROUND OF THE INVENTION

1. Field of the Invention

The present invention relates generally to an apparatus, provided together with a fuel tank mounted on a vehicle, for collection and treatment of vaporized fuel in the fuel tank.

2. Description of the Related Art

Fuel vapor treating apparatuses, which are used with vehicle fuel tanks are known in the prior art. Typically, such apparatuses are provided with a canister, which draws in and collects vaporized fuel from the fuel tank. A purge line, extending from the canister, is connected to an engine intake passage. The canister is filled with an adsorbent comprised of activated carbon or the like. The canister first adsorbs the fuel components of the fuel vapor. The canister then discharges only the residual gas, from which the fuel components (particularly hydrocarbon, HC) have been extracted, into the atmosphere. The fuel collected in the canister is purged into the intake passage via the purge line during operation of the engine.

To suppress a reduction in adsorbing performance of the adsorbent, it is required that the fuel components adsorbed in the adsorbent be separated from the adsorbent within a short period of time. To accomplish this, an increase in the temperature of the adsorbent is desirable. The fuel is generally comprised of components having a high boiling point and components having a low boiling point. Fuel components having a high boiling point possess a strong adsorbing characteristic with respect to the adsorbent. Thus, it is necessary to raise the temperature of the adsorbent to a predetermined value. However, for efficient adsorption of such fuel components, it is advantageous for the adsorbent to have a low temperature.

Japanese Unexamined Patent Publication 63-176650 discloses a fuel vapor collecting apparatus. One of the objectives of this invention is to prevent a reduction in the adsorbing performance of an adsorbent. As shown in FIG. 6, the apparatus is provided with a first and second canister 62, 63 to collect fuel vapor evaporated in a fuel tank 61. The first canister 62 contains an adsorbent 64 that mainly adsorbs fuel components having a high boiling point. The second canister 63 contains an adsorbent 65 that mainly adsorbs fuel components having a low boiling point. A vapor line 66 extending from the tank 61 is connected to the first canister 62. Fuel is supplied to a carburetor 67 from a float chamber 68. A vapor line 69 extending from the float chamber 68 is connected to the first canister 62. A vapor line 70 connects both canisters 62, 63. Purge lines 71, 72 extending from each canister 62, 63, respectively, are connected to an intake passage 73 of an engine (not shown). Each electromagnetic valve 74, 75, 76, and 77 selectively opens and closes the associated line 69, 70, 71, and 72. A heater 79 provided in the first canister 62 heats the adsorbent 69 when necessary. The heater 79 is actuated to separate the fuel components having a high boiling point from the canister 62. A PTC heater or a heating device using warm water or the like may be employed as the heater 79.

When the engine is stopped, the fuel vaporized in the tank 61 and float chamber 68 passes through the associated vapor lines 66, 69 and flows into the first canister 62. In this canister 62, the adsorbent 64 mainly adsorbs the fuel components having a high boiling point. The fuel vapor that passes through the first canister 62 further flows into the second canister 63 by way of the vapor line 70. In this canister 63, the adsorbent 65 mainly adsorbs the fuel components having a low boiling point. When the engine is started, the fuel adsorbed in the adsorbent 64, 65 of the associated canister 62, 63 are separated therefrom and purged into the intake passage 73 via each purge line 71, 72 for combustion inside the engine. Simultaneously, the heater 79 is actuated to heat the adsorbent 64 for efficient separation of the high boiling point fuel components from the adsorbent 64.

However, the apparatus disclosed in the above publication includes a special heater 79 to heat the adsorbent 64 of the first canister 62. If the heater 79 is constituted by a PTC heater, it is necessary to attach the PTC heater to the canister 62. In addition, a controlling device is necessary to control the heater. If the heater 79 is constituted by a heating device which uses warm water, the cooling water of the engine may be utilized. Nevertheless, in this case, special pipes will be necessary to convey cooling water from the engine to the canister 62.

SUMMARY OF THE INVENTION

Accordingly, it is a primary objective of the present invention to provide a vehicle fuel vapor treating apparatus that is capable of efficiently separating fuel components adsorbed in an adsorbent from the adsorbent by heating the adsorbent contained in a canister.

To achieve the foregoing and other objects and in accordance with the purpose of the present invention, an apparatus for treating fuel vapor generated in a fuel tank of a vehicle is provided. The vehicle has an engine with an air intake passage, a fuel tank, a body, and an engine exhaust pipe. The apparatus comprises a canister having a vapor inlet communicating with the tank, a vapor outlet communicating with the engine's air intake passage by way of a purge line, and an adsorbent. The fuel vapor generated in the tank is introduced to the canister through the inlet. Fuel components contained in the fuel vapor are collected by the adsorbent. The fuel components are subsequently separated from the adsorbent and purged into the engine's air intake passage through the purge line during operation of the engine. The exhaust pipe is located in a position relatively near to the canister. The adsorbent is heated by heat from the exhaust pipe to facilitate separation of the fuel components from the adsorbent.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

Figure 1:
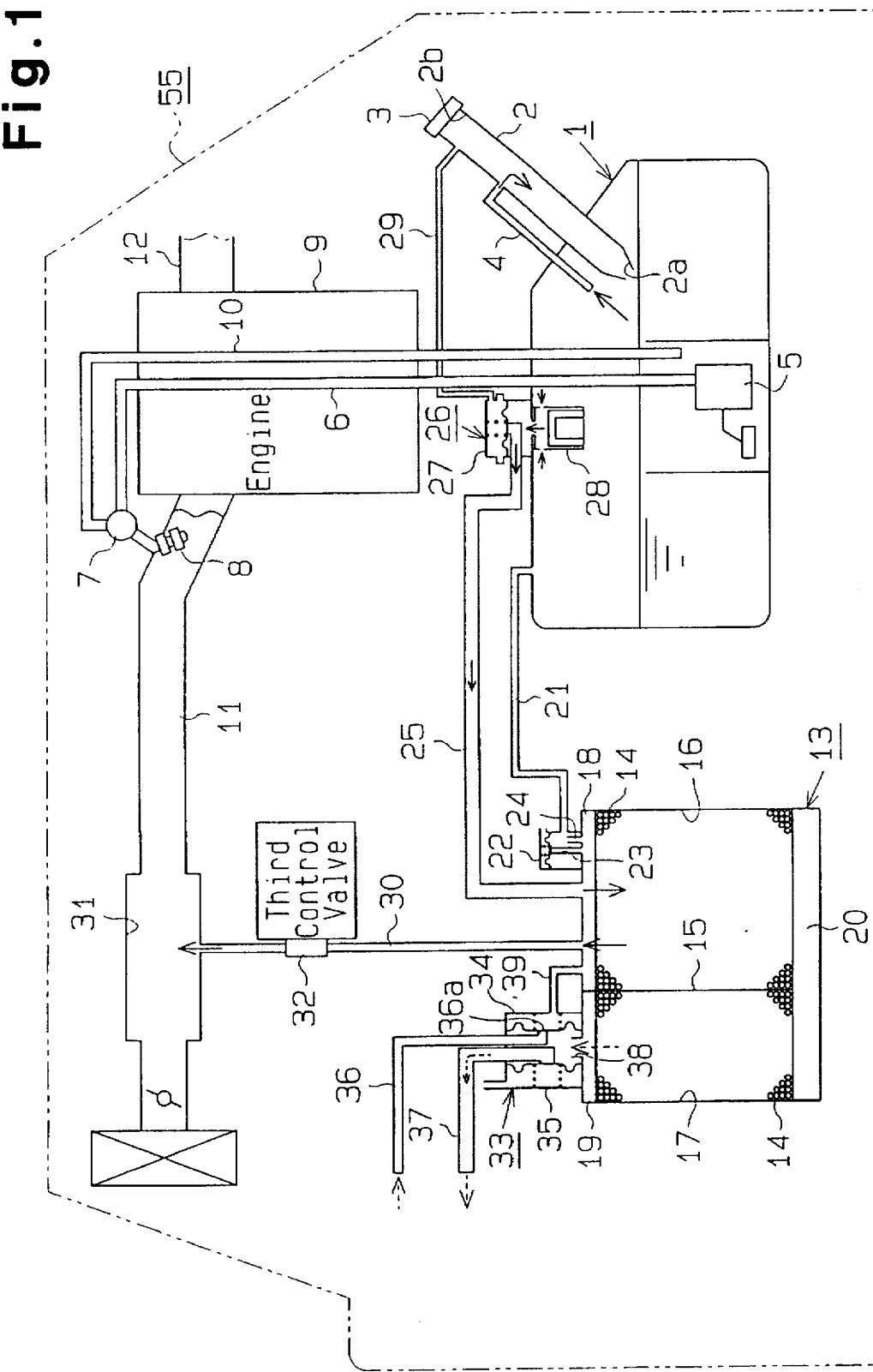
FIG. 1 is a diagrammatic illustration showing the structure of a fuel vapor treating apparatus according to one embodiment of the present invention.

FIG. 1 is a diagrammatic illustration of the structure of the fuel vapor treating apparatus of the present invention. A gasoline engine system of an automobile 55 has a fuel tank 1 in which fuel is reserved. The tank 1 includes a filler pipe 2 for adding fuel to the tank 1. The pipe 2 has a restriction 2a at its inner end, which is located inside the tank 1. A filler hole 2b is provided at the outer end of the pipe 2, which projects outside of the tank 1. A fuel nozzle (not shown) is inserted into the filler hole 2b for refueling. A removable cap 3 is attached to the filler hole 2b. Another pipe 4 communicates the pipe 2 with the tank 1.

A pump 5 incorporated in the tank 1 draws in fuel inside the tank 1. A main line 6 extending from the tank 1 is connected to a delivery pipe 7. A plurality of injectors 8, provided on the pipe 7, are arranged in correspondence with cylinders of an engine 9. A return line 10 extending from the pipe 7 is connected to the tank 1.

Actuation of the pump 5 causes the fuel discharged from the pump 5 to be sent to the delivery pipe 7 via the main line 6. The delivery pipe 7 distributes fuel to each injector 8. As each injector 8 is actuated, the fuel distributed to each injector 8 is injected into the intake passage 11. The injected fuel is supplied to each cylinder together with air for combustion. The combusted gas produced inside the engine 9 is emitted into the atmosphere via an exhaust passage 12. The residual fuel in the delivery pipe 7 is returned to the tank 1 via the return line 10.

Figure 2:
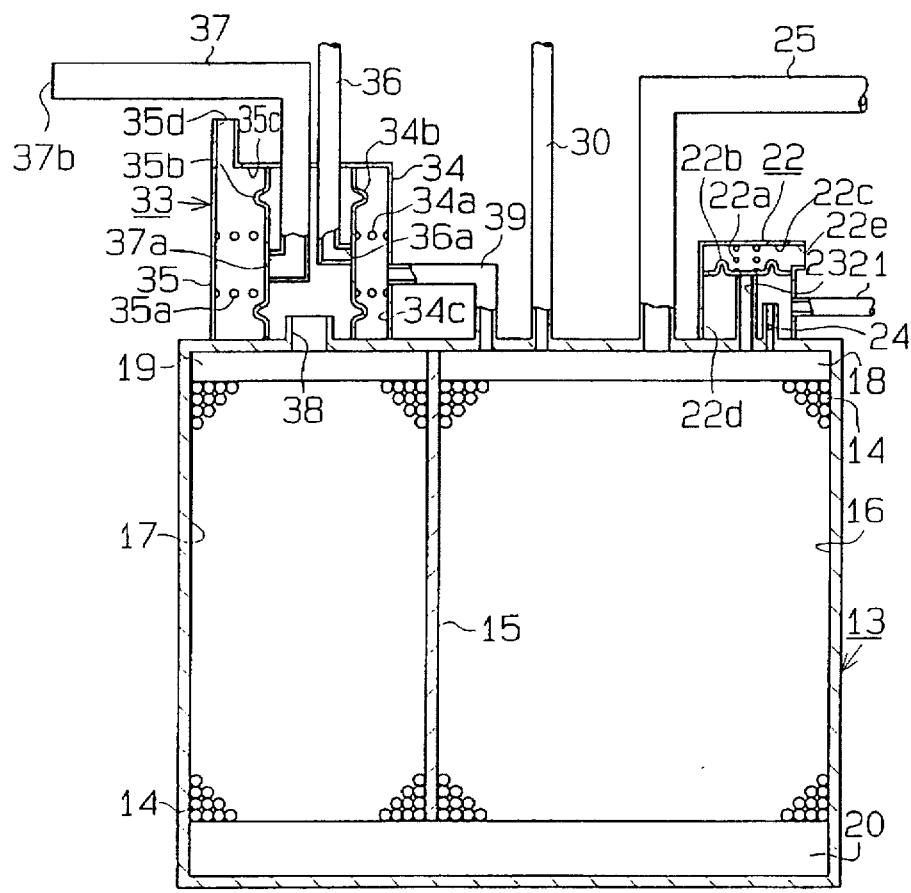
FIG. 2 is an enlarged cross-sectional view showing the canister of the apparatus of FIG. 1.

The fuel vapor treating apparatus has a canister 13 to adsorb and collect fuel that vaporizes in the tank 1. The canister 13 shown in FIG. 1 is enlarged in FIG. 2. As shown in FIGS. 1 and 2, the canister is filled with an adsorbent 14 comprised of activated carbon or the like. The fuel vapor drawn into the canister 13 from the tank 1 is adsorbed by the adsorbent 14. A partition 15 extending vertically inside the canister 13 defines adjacent first and second compartments 16, 17. The adsorbent 14 is accommodated in each compartment 16, 17. A first space 18 and a second space 19, which do not contain the adsorbent 14, are defined above the compartment 16 and the compartment 17. A third space 20, which does not contain the adsorbent 14 and which communicates the two compartments 16, 17 with each other, is defined below the compartments 16, 17.

A vapor line 21 extending from the tank 1 is connected to the canister 13 to draw in the fuel vaporized in the tank 1. An end of the vapor line 21 is connected to a first control valve 22, which is provided corresponding to an inlet port 23. The inlet port 23 is communicated with the first space 18. The control valve 22 is opened when the internal pressure of the tank 1 reaches or exceeds a predetermined value to permit the fuel vapor to flow toward the canister 13. The control valve 22 has a diaphragm 22b that is urged toward the port 23 by a spring 22a to close it. The diaphragm 22b defines an atmospheric chamber 22c at its upper side and a pressure chamber 22d at its lower side in the control valve 22. The spring 22a arranged in the atmospheric chamber 22c urges the diaphragm 22b in a downward direction. The atmospheric chamber 22c is communicated with the atmosphere via an atmospheric port 22e. The pressure chamber 22d is connected to the vapor line 21. A check ball type relief valve 24 is provided in the pressure chamber 22d adjacent to the port 23. The relief valve 24 permits gas to flow from the canister 13 to the vapor line 21 and prohibits the gas to flow in the opposite direction.

When the positive pressure in the tank 1 reaches or exceeds a predetermined value, the pressure acts on the pressure chamber 22d of the control valve 22 through the vapor line 21. This pushes the diaphragm 22b upward against the urging force of the spring 22a and opens the port 23. As a result, the fuel vapor from the tank 1 is introduced into the canister 13 by way of the vapor line 21. Contrarily, when the pressure in the tank 1 becomes negative relative to the canister 13, the pressure acts on the pressure chamber 22d and opens the relief valve 24. As a result, gas may flow from the canister 13 to the vapor line 21.

The vapor line 21 introduces the fuel vaporized in the tank 1 when the automobile is driven and when it is parked; that is, when the engine is running or stopped. In this state, the amount of vaporized fuel is relatively small and the change in its amount is gradual. Thus, the cross-sectional area of the vapor line 21 is relatively small. However, a large amount of fuel vapor is generated during refueling. Therefore, a large amount of fuel vapor must be collected without emitting the vapor into the atmosphere during refueling.

Figure 3:
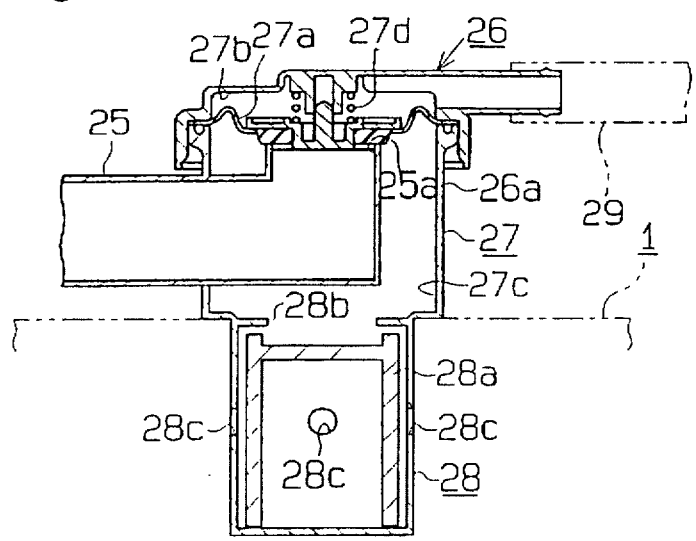
FIG. 3 is an enlarged cross-sectional view showing a second control valve of the apparatus of FIG. 1.

To fulfill this requirement, the treating apparatus of FIG. 1 has a breather line 25 in addition to the vapor line 21. The breather line 25 connects the tank 1 to the canister 13. The breather line 25 readily introduces the large amount of fuel vaporized during refueling into the canister 13. To permit a large flow rate of fuel vapor, the cross-sectional area of the breather line 25 is ten times larger than that of the vapor line 21. One end of the breather line 25 is connected to the first space 18 defined in the canister 13 while the other end is connected to a second valve 26 provided on the tank 1. The control valve 26 is opened during refueling and closed at other times. The control valve 26 shown in FIG. 1 is enlarged in FIG. 3. As shown in FIGS. 1 and 3, the control valve 26 includes a differential pressure valve 27 located on the upper surface of the tank 1, and a float valve 28 located inside the tank 1. The control valve 26 also includes a cylindrical housing 26a, which is fixed to the tank 1 and has a closed bottom. The differential pressure valve 27 is constituted by the portion of the housing 26a that is above the upper surface of the tank 1. The float valve 28 is constituted by the remaining portion of the housing 26a, which is inside the tank 1.

A diaphragm 27a defines a first and second pressure chamber 27b, 27c in the portion of the housing 26a that constitutes the differential pressure valve 27. A spring 27d located in the first pressure chamber 27b urges the diaphragm 27a downward. The first pressure chamber 27b is connected to the filler pipe 2 through a pipe 29. An end of the breather line 25 is connected to the second pressure chamber 27c.

The float valve 28 includes a float 28a accommodated in the housing 26a and a valve opening 28b provided in the housing 26a at a position corresponding to the float 28a. The valve opening 28b is between the float valve 28 and the second pressure chamber 27c of the differential pressure valve 27. A plurality of holes 28c formed in the side wall of the housing 26a below the valve opening 28b communicate the inside of the housing 26a with the inside of the tank 1.

When the height of the surface of the fuel in the tank 1 becomes lower than the position of the holes 28c, the float 28, lowered by its own weight, opens the valve opening 28b. When the height of the fuel surface becomes higher than the position of the holes 28c, fuel enters the housing 26a through the holes 28c. This raises the float 28 and closes the valve opening 28b.

Accordingly, when the filler hole 2b of the filler pipe 2 is closed by the cap 3 and the fuel surface is lower than the holes 28c, the float 28a opens the valve opening 28b. When the valve opening 28b is opened, the internal pressure of the tank 1 acts on the first pressure chamber 27b of the differential pressure valve 27 through the pipe 29. In addition, the internal pressure of the tank 1 acts on the second pressure chamber 27c through the holes 28c and the opening 28b. Therefore, the pressure acting on the diaphragm 27a in both chambers 27b, 27c is equal. This results in the diaphragm 27a closing an opened end 25a of the breather line 25.

On the other hand, when the filler hole 2b is opened during refueling, the atmospheric pressure acts on the first pressure chamber 27b of the differential pressure valve 27 through the pipe 29. In this state, the internal pressure of the tank 1 increases when a large amount of fuel vaporizes during refueling. This imbalances the pressure of the chambers 27b, 27c and displaces the diaphragm 27a upward thus opening the opened end 25a of the breather line 25. As a result, the large amount of vaporized fuel in the tank 1 is sent to the canister 13 through the breather line 25. Afterward, the height of the fuel surface in the tank 1 rises and causes the float 28a to close the valve opening 28b. This displaces the diaphragm 27a downward with the urging force of the spring 27d and closes the opened end 25a of the breather line 25.

The vaporized fuel introduced into the canister 13 through each line 21, 25 is adsorbed and collected in the adsorbent 14. With the treating apparatus of the present embodiment, the fuel collected in the canister 13 is ultimately treated by having it combusted in the engine 9. For combustion of the vaporized fuel, a purge line 30 extending from the first space 18 of the canister 13 is connected to a surge tank 31 of the intake passage 11. A third control valve 32 provided in the purge line 30 selectively opens and closes the line 30 and also adjusts the opening of the line 30. The control valve 32 is opened when the engine is operated. When the control valve 32 is opened during operation of the engine 9, the negative intake pressure produced in the surge tank 31 acts on the first space 18 of the canister 13 through the purge line 30. The negative pressure causes the fuel components to be separated from the adsorbent 14 and purged into the surge tank 31 through the purge line 30. The purged fuel is combusted in the engine 9.

A fourth control valve 33 provided at a position corresponding to the second space 19 of the canister 13 has a first valve mechanism 34, which draws atmospheric air into the canister 13, and a second valve mechanism 35 which emits the gas in the canister into the atmosphere. The valve mechanisms 34, 35 are provided with pipes 36, 37, respectively. The first valve mechanism 34 is opened by the negative pressure acting on the canister 13 when the fuel components are drawn into the purge line 30 from the canister 13 by the negative intake pressure. This permits atmospheric air to be drawn into the canister 13. As shown in FIG. 2, this valve mechanism 34 is provided at a position corresponding to an outlet port 38 of the canister 13. The valve mechanism 34 includes a diaphragm 34b which is urged by a spring 34a toward a direction closing an opened end 36a of the pipe 36. A pressure chamber 34c is defined by the diaphragm 34b in the valve mechanism 34. The pressure chamber 34c is communicated with the first space 18 through a communication passage 39.

When the absolute value of the negative pressure inside the canister 13 reaches or exceeds a predetermined value, the pressure acts on the diaphragm 34b by way of the communication passage 39 and the pressure chamber 34c. The acting pressure displaces the diaphragm 34b against the urging force of the spring 34a and opens the opened end 36a of the pipe 36. This permits the flow of atmospheric air from the pipe 36 to the canister 13. The atmospheric air is introduced into the canister 13 through the port 38. By drawing the atmospheric air into the canister 13 in this manner, the fuel components are purged from the canister 13 to the purge line 30.

When the positive pressure inside the canister 13 reaches or exceeds a predetermined value, the second valve mechanism 35 is opened. This allows gas to flow outward through the outlet port 38 and the pipe 37 from the canister 13 and to be emitted into the atmosphere. The valve mechanism 35 is provided at a position corresponding to the outlet port 38 of the canister 13. The valve mechanism 35 includes a diaphragm 35b, which is urged by a spring 35a toward a direction closing an opened end 37a of the pipe 37. An atmospheric chamber 35c is defined by the diaphragm 35b in the valve mechanism 35. The atmospheric chamber 35c is communicated with the atmosphere through an atmospheric port 35d.

As the positive pressure inside the canister 13 reaches or exceeds a predetermined value, the pressure acts on the diaphragm 35b through the outlet port 38. The acting pressure displaces the diaphragm 35b against the urging force of the spring 35a and opens the opened end 37a of the pipe 37. This permits the flow of gas from the canister 13 to the pipe 37. As a result, only purified gas, which is the residual gas of the fuel vapor after adsorption of its fuel components by the adsorbent 14, is emitted into the atmosphere.

Figure 4:
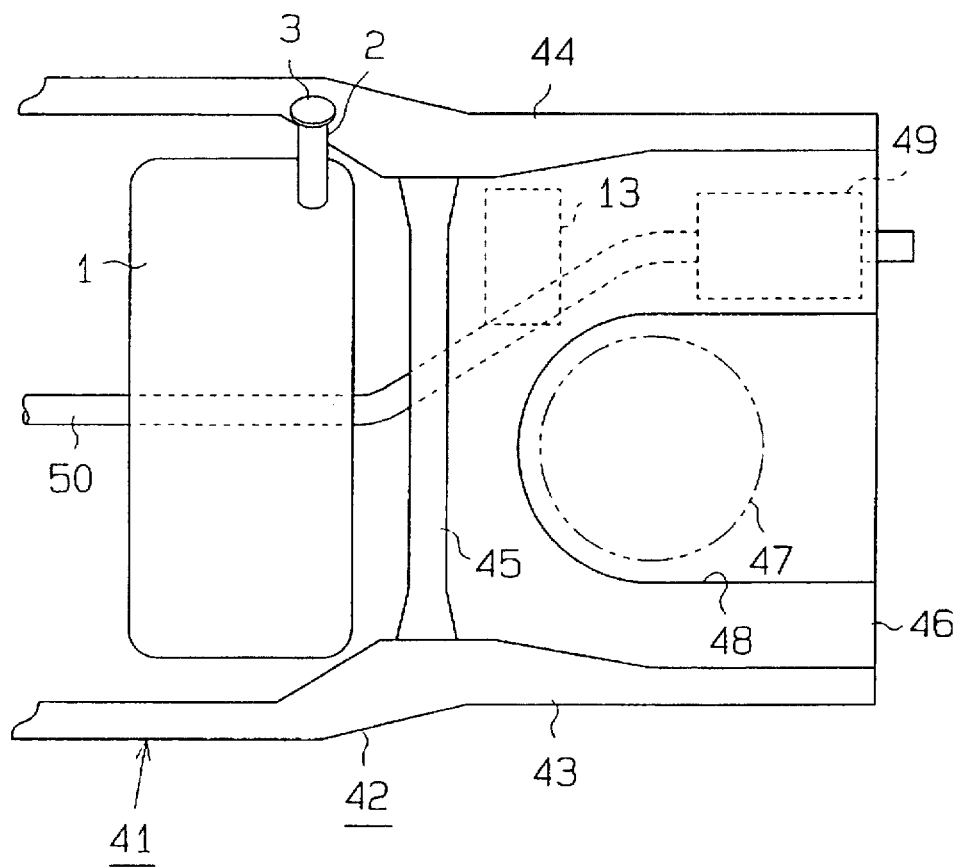
FIG. 4 is a plan view showing various parts of the fuel vapor treating apparatus disposed at the rear section of an automobile body.
Figure 5:
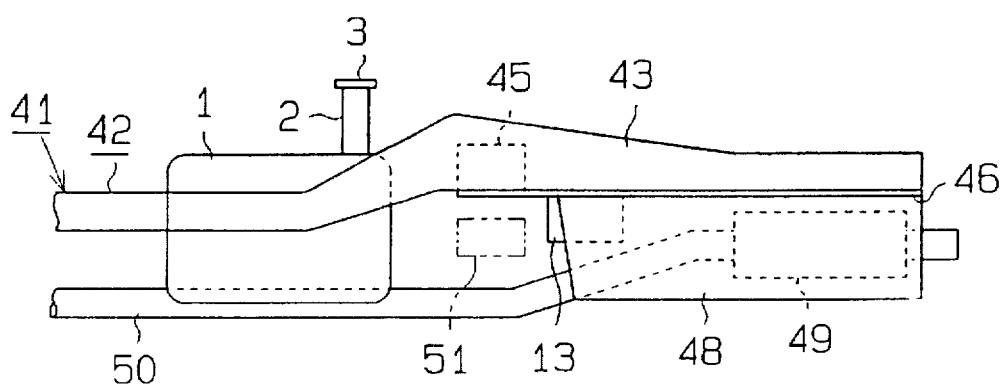
FIG. 5 is a side view of the automobile body of FIG. 4.
Figure 6:
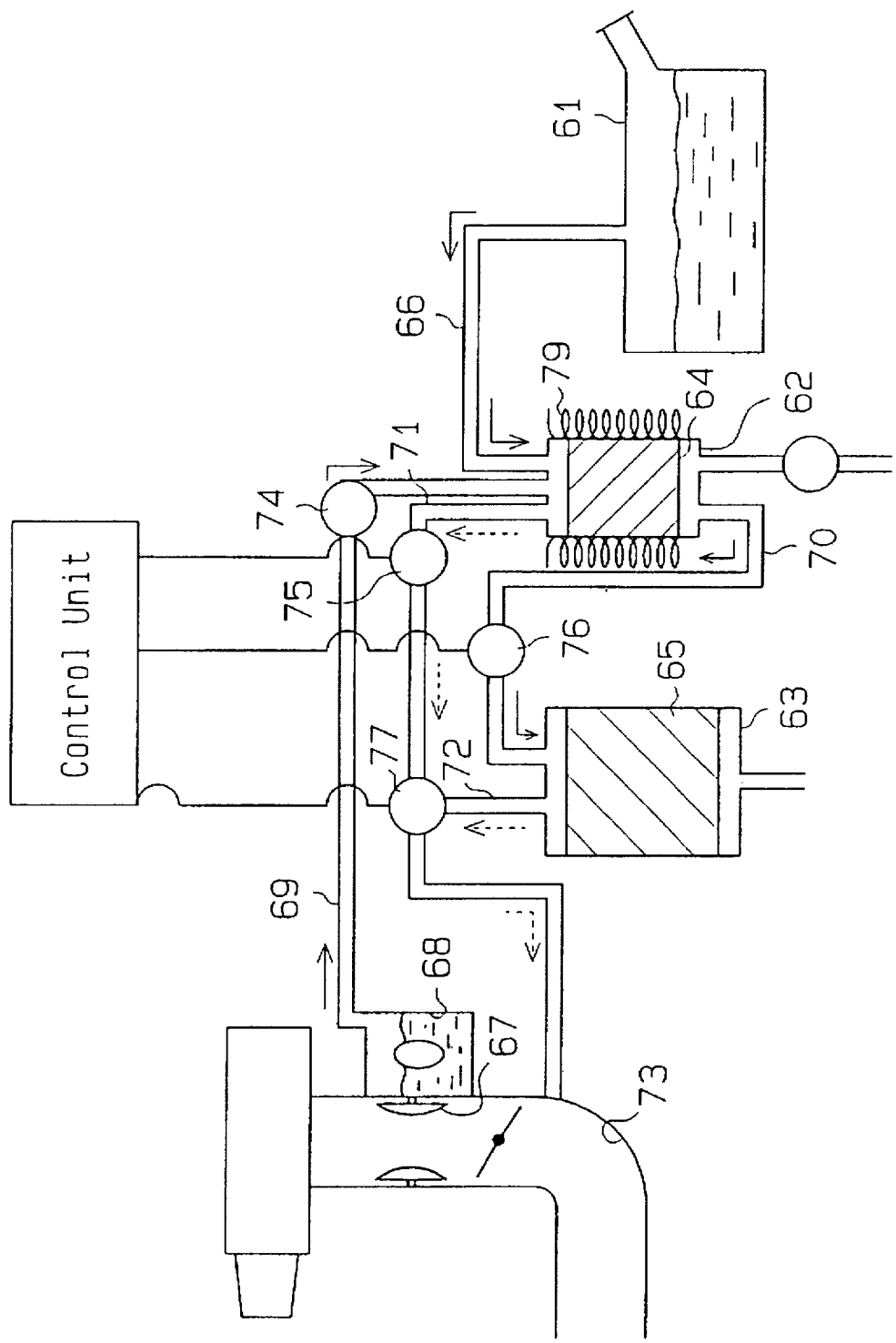
FIG. 6 is a diagrammatic illustration showing the structure of a prior art fuel vapor collecting apparatus.

In this embodiment, special consideration to the arrangement of the canister 13 in the automobile 55 has been made to improve the adsorbing performance of the adsorbent 14 in the canister 13. FIGS. 4 and 5 show the rear section of an automobile body 41. A frame 42, which constitutes the rear section of the body 41 includes a left side member 43, a right side member 44, and a cross member 45, which connects the two members 43, 44 to each other. A floor pan 46 arranged between each member 43–45 has a tire housing 48 to accommodate a spare tire 47. The housing 48 is recessed downward from the position of each member 43–45. A muffler 49 for exhausted gas is arranged at one side of the housing 48. The muffler 49 is attached to the floor pan 46 by brackets or the like (not shown).

The tank 1 is arranged on the opposite side of the housing 48 with the cross member 45 in between. The tank 1 is secured to each member 43–45 by brackets or the like (not shown). An exhaust pipe 50 extends from the front section of the body 41 to its rear section. The pipe 50 is arranged to run under each member 43–45 and is connected to the muffler 49. The pipe 50 constitutes a portion of the intake passage 12, which extends from the engine 9 and is shown in FIG. 1. The pipe 50 extends along the middle of the body 41, runs under the tank 1, and is bent near the cross member 45 to be connected to the muffler 49. The exhausted gas from the engine 9 is emitted into the atmosphere from the muffler 49 via the pipe 50. The canister 13 is disposed in the space defined between the side member 44, the cross member 45, the floor pan 46, the housing 48, and the pipe 50. The canister 13 is secured to the floor pan 46 by brackets of the like (not shown). As shown in FIG. 5, a sub-frame 51 is provided below the cross member 45.

In the above structure, the side members 43, 44 are distinguished from the roof, floor, front body, etc. The side members are the main framework members which ensure the rigidity of the body 41. The cross-section of the side members 43, 44 is closed at most locations. In addition, reinforcements are provided at the cornered sections of the side members 43, 44. Among the long, narrow framework members employed to ensure the strength and rigidity of the body 41, the cross member 45 refers to a laterally extending framework member.

With the above structure, the heat of the exhaust gas passing through the pipe 50 accumulates in the space encompassed by the side member 44, the cross member 45, the floor pan 46, the housing 48, and the pipe 50. It is difficult for the heat of the exhaust gas to escape from this space. Therefore, the temperature of the space is raised and the canister 13 is heated. This effectively heats the adsorbent 14 in the canister 13. Accordingly, the separation of the fuel components from the adsorbent 14 is enhanced by the raised temperature of the adsorbent 14. As a result, when the fuel components are purged from the canister 13 during operation of the engine 9, it is possible to effectively heat the adsorbent 14 as required and thus efficiently separate the fuel components from the adsorbent 14. Such heating of the adsorbent 14 is effective particularly when separating the high boiling point fuel components from the adsorbent 14. Furthermore, such effects are obtained by the arrangement of the canister 13 in the body 41. Therefore, this extremely simple structural arrangement has the same effects of the prior art, in which a special heater 79 was provided.

When the engine is stopped (including when the tank 1 is refueled), the exhaust gas does not pass through the pipe 50. This results in the temperature of the adsorbent 14 being lowered to the ambient temperature of the body 41. Consequently, it is possible to lower the temperature of the adsorbent 14 as required for effective adsorption of the vaporized fuel when the engine 9 is stopped and when refueling is performed; that is, when it is necessary for vaporized fuel to be adsorbed by the adsorbent 14. The above arrangement of the canister 13 allows the temperature of the canister 13 to be lower when the engine 9 is stopped than when the canister 13 is located in an engine compartment (not shown). Thus, it is possible to improve the fuel adsorbing performance of the adsorbent 14 when the engine 9 is stopped.

In the present embodiment, since the canister is encompassed by the side member 44, the cross member 45, the floor pan 46, the housing 48, and the pipe 50, the canister 13 is protected from pebbles, mud, and water when the automobile is driven. Hence, the possibility of damaging the canister 13 is reduced.

Although only one embodiment of the present invention has been described herein, it should be apparent to those skilled in the art that the present invention may be embodied in many other specific forms without departing from the spirit or scope of the invention. Particularly, it should be understood that the present invention may be embodied in the forms described below.

In the above description, a single canister 13 was provided for a single exhaust pipe 50, arranged at one side of the rear section of the body 41, as shown in FIG. 4. For an automobile that has two exhaust pipes arranged at both sides of the rear section of the body, a canister may be provided for each pipe. In this case, it is possible to increase the total volume of the adsorbents in the two canisters.

The fuel vapor treating apparatus described above includes the breather line 25 and the second control valve 25, which send a large amount of fuel vaporized in the tank 1 to the canister 13, as shown in FIG. 1. However, the breather line 25 and the second valve 26 may be omitted.

Therefore, the present examples and embodiments are to be considered as illustrative and not restrictive and the invention is not to be limited to the details given herein, but may be modified within the scope of the appended claims.

What is claimed is:

1. An apparatus for treating fuel vapor generated in a fuel tank of a vehicle, the vehicle having an engine with an air intake passage, a fuel tank, a body, and an engine exhaust pipe, said apparatus comprising:

a canister having a vapor inlet communicating with the tank, a vapor outlet communicating with the engine's air intake passage by way of a purge line, and an adsorbent, wherein fuel vapor generated in the tank is introduced to the canister through the inlet, and wherein fuel components contained in the fuel vapor are collected by the adsorbent, and wherein the fuel components are subsequently separated from the adsorbent and purged into the engine's air intake passage through the purge line during operation of the engine;

wherein the exhaust pipe is located in a position relatively near to the canister, and wherein the adsorbent is heated by heat from the exhaust pipe to facilitate separation of the fuel components from the adsorbent;

wherein the canister is located in an air space formed by the body of the vehicle, and wherein the exhaust pipe is located to heat the air space, the canister, and the adsorbent, and is disposed adjacent to and below the canister;

wherein the body of the vehicle includes a left side frame member, a right side frame member, a cross frame member connecting the right and left side frame members, and wherein the canister is located such that it is in a space surrounded by the side frame members and the cross frame member and the exhaust pipe passes adjacent to the space to heat the space, which causes the adsorbent to be heated; and wherein the vehicle includes a housing for a spare tire, and wherein the spare tire housing defines the heated space in which the canister is located.

2. The apparatus according to claim 1, including a breather line having a relatively large capacity for introducing fuel vapor to the canister during refueling.

3. The apparatus according to claim 2 including a valve selectively opened and closed by a difference between the pressure of the tank and that of the atmosphere, the valve serving to permit fuel vapor to flow to the canister through the breather line during refueling.

4. The apparatus according to claim 2 including a vapor line having a relatively small capacity for introducing fuel vapor to the canister at times other than during refueling.

* * * * *